(12) United States Patent
Liu et al.

(10) Patent No.: US 9,867,262 B2
(45) Date of Patent: Jan. 9, 2018

(54) LAMP EQUIPMENT HAVING MULTI-MODES BLUETOOTH MODULE AND MODE SWITCHING METHOD OF THE BLUETOOTH MODULE

(71) Applicant: ANCHOR TECH CO., LTD, Taipei (TW)

(72) Inventors: De-Cheng Liu, Taipei (TW); Chien-Yao Huang, Taipei (TW)

(73) Assignee: ANCHOR TECH CO., LTD, Taipei (TW)

( * ) Notice: Subject to any disclaimer, the term of this patent is extended or adjusted under 35 U.S.C. 154(b) by 0 days.

(21) Appl. No.: 15/593,325

(22) Filed: May 12, 2017

(65) Prior Publication Data

US 2017/0339771 A1 Nov. 23, 2017

(30) Foreign Application Priority Data

May 17, 2016 (TW) .............................. 105115143 A

(51) Int. Cl.
*H05B 37/02* (2006.01)
*H05B 33/08* (2006.01)
*H04W 4/00* (2009.01)
*H04W 84/18* (2009.01)
*H04W 40/24* (2009.01)
(Continued)

(52) U.S. Cl.
CPC ........ *H05B 37/0272* (2013.01); *H04W 4/008* (2013.01); *H04W 40/244* (2013.01); *H04W 48/10* (2013.01); *H04W 84/18* (2013.01); *H05B 33/0815* (2013.01); *H05B 37/0281* (2013.01); *H04L 27/363* (2013.01); *H04W 76/023* (2013.01)

(58) Field of Classification Search
None
See application file for complete search history.

(56) References Cited

U.S. PATENT DOCUMENTS

| 2008/0211427 A1* | 9/2008 | Budde | H05B 37/0272 315/294 |
|---|---|---|---|
| 2011/0076950 A1* | 3/2011 | Pope | H04W 52/0229 455/41.3 |
| 2014/0147067 A1* | 5/2014 | Seok | F16C 43/02 384/397 |

FOREIGN PATENT DOCUMENTS

| CN | 103052233 A | 4/2013 |
|---|---|---|
| TW | M460478 U | 8/2013 |

OTHER PUBLICATIONS

Office Action dated Aug. 14, 2017 of the corresponding Taiwan patent application No. 105115143.

* cited by examiner

*Primary Examiner* — Jany Richardson
(74) *Attorney, Agent, or Firm* — Chun-Ming Shih; HDLS IPR Services

(57) ABSTRACT

Lamp equipment having a LED, a driver and a bluetooth module is disclosed. The driver is connected to the LED to control thereof, and the bluetooth module is connected to the driver for receiving power. The bluetooth module supports a mesh-network mode and a beacon mode and switches between this two modes periodically. When working under the mesh-network mode, the bluetooth module is able to execute peer-to-peer transmission with other bluetooth modules within its transmission range, and adjusts its beacon mode's status and beacon content based on received command and data. When working under the beacon mode, the (Continued)

bluetooth module is able to broadcast the beacon content, so as to push message externally and provide micro-location function for the outside.

10 Claims, 9 Drawing Sheets

(51) Int. Cl.
    *H04W 48/10*     (2009.01)
    *H04W 76/02*     (2009.01)
    *H04L 27/36*     (2006.01)

LAMP EQUIPMENT HAVING MULTI-MODES BLUETOOTH MODULE AND MODE SWITCHING METHOD OF THE BLUETOOTH MODULE

BACKGROUND OF THE INVENTION

Field of the Invention

The present invention relates to a lamp having bluetooth module and controlling method of the bluetooth module, especially to a lamp having multi-modes bluetooth module, and mode switching method of the bluetooth module.

Description of Prior Art

A beacon device is a device adopting bluetooth low energy (BLE) protocol, generally used for pushing message to electronic devices within a transmission range.

Generally, one or more beacon contents stored in beacon device are configured by administrator, and beacon device pushes the beacon content stored in advance to electronic device within transmission range by broadcasting, to make user able to see directly beacon content pushed by the beacon device on the electronic device. In this way, the user can easily obtain particular message (for example, the beacon content is sale information of market), or perform micro-location by the beacon device (for example, the beacon content is the current location of the user).

As mentioned above, the beacon content is configured by the administrator, thus when beacon content needs to be adjusted (for example, the particular message above needs to be changed, or the beacon device needs to be moved), the administrator has to head to a site under condition and establish connection between device (such as computer) and the beacon device, then adjust the beacon content manually, resulting in lots of effort.

Moreover, the beacon device currently in market is often independent entity, if not necessary, the beacon device has to be removed from an installation position. In this way, if there are many beacon devices, then it is also an important problem to effectively store the removed beacon devices.

SUMMARY OF THE INVENTION

The present invention is mainly directed to provide a lamp having multi-modes bluetooth module and the mode switching method, controlling the bluetooth module to switch rapidly between two modes, to implement a single bluetooth module supporting both peer-to-peer transmission and broadcast.

Accordingly, the present invention discloses a lamp including a LED, a driver and a bluetooth module. The driver is electrically connected to the LED, and controls the LED. The bluetooth module is electrically connected to the driver for receiving power.

The bluetooth module supports a mesh network mode and a beacon mode, and periodically switches between the two modes. The bluetooth module executes peer-to-peer transmission with other bluetooth modules within transmission range, when working under the mesh network mode, and adjusts a status of the beacon mode and a beacon content based on the received command and data. The bluetooth module broadcasts the beacon content externally when working under the beacon mode, to push message externally and provide micro-location to the outside.

Compared to the existing technology, in the present invention, the bluetooth module can broadcast under the beacon mode according to the beacon content, and can receive and transmit command and data related to beacon function under the mesh network mode, for adjusting relative setting of the beacon mode. In this way, the administrator can directly enable/disable beacon function of each bluetooth module in remote environment, and directly adjust the corresponding beacon content, therefore facilitating convenience.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1:
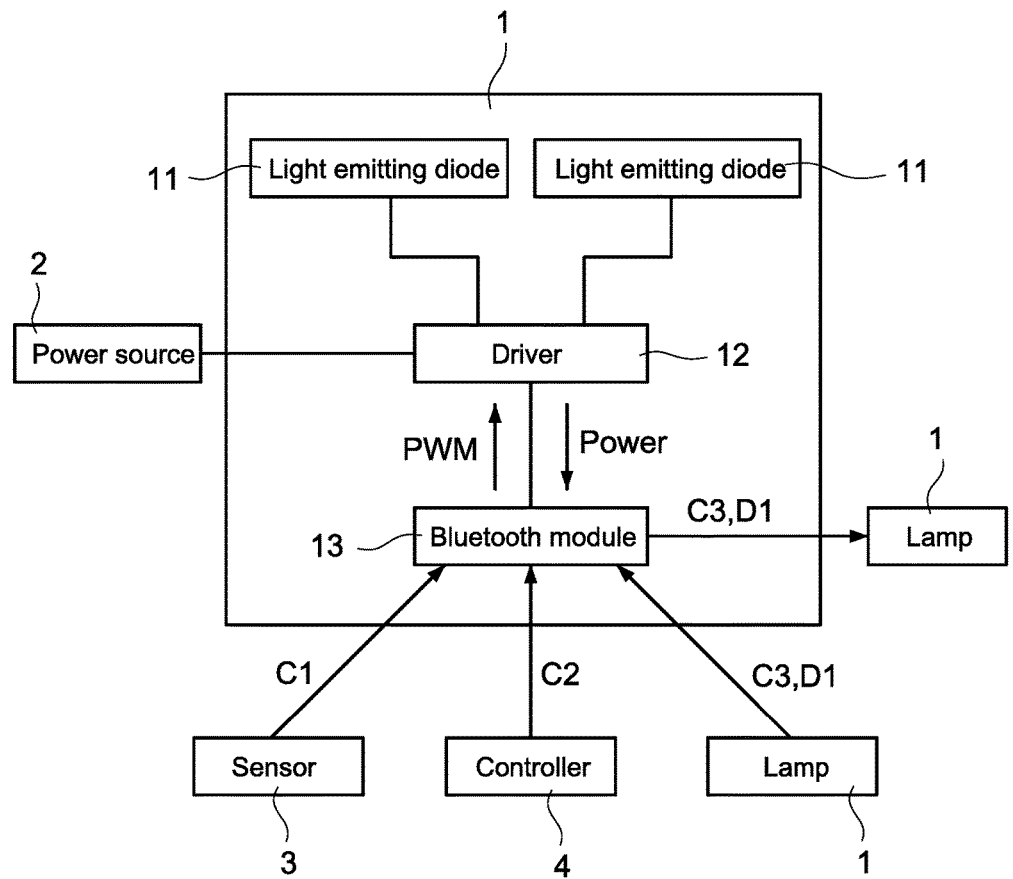
FIG. 1 shows a block diagram of a lamp according to a first embodiment of the present invention.

Please refer to FIG. 1 first, FIG. 1 shows a block diagram of a lamp according to a first embodiment of the present invention. The present invention discloses a lamp having multi-modes bluetooth module (hereafter lamp 1), as shown in FIG. 1, the lamp 1 mainly has one or more light emitting diodes (LEDs) 11, a driver 12 and a bluetooth module 13. The bluetooth module 13 can switch for operating under at least two modes by inner software.

The driver 12 is electrically connected to the LED 11, and controls the LED 11. Specifically, the driver 12 is externally connected to a power source 2, receives power for the lamp 1 from the power source 2, and accordingly controls turning on, turning off the LED 11, or brightness adjustment of the LED 11.

The bluetooth module 13 is electrically connected to the driver 12, and receives power from the driver 12. In the present invention, the bluetooth module 13 can be used as a beacon device under one of the modes, and arranged in shell (not shown) of the lamp 1, and share the power source 2 with the lamp 1. Thus, the bluetooth module 13 needs no battery built-in, and there is no general need for changing battery when the battery power is low in the beacon device.

The present invention is mainly characterized in that the bluetooth module 13 at least supports a mesh network mode and a beacon mode, controlled by the inner software of the bluetooth module 13, the bluetooth module 13 can periodically (such as every 1 second) switch between the mesh network mode and the beacon mode, for operating periodically under modes (for example, operating under the mesh network mode for 900 ms of 1 s, and under the beacon mode for the 100 ms of 1 s).

The bluetooth module 13 can be connected with a device supporting BTE protocol (such as other bluetooth modules, or other lamps supporting bluetooth module) within a transmission range when working under the mesh network mode, and transmits command and data peer-to-peer. The bluetooth module 13 pushes beacon content (such as the beacon content 1341 shown in FIG. 2) stored therein externally by broadcasting, when working under the beacon mode.

Specifically, the bluetooth module 13 can be wirelessly connected to a sensor 3 external, and receive a first control command C1 sent from the sensor 3 when working under the mesh network mode. The bluetooth module can generate (according to the first control command C1) a corresponding pulse width modulation (PWM) signal and output the PWM signal to the driver 12, in this way, the driver 12 can control (according to the PWM signal) the LED 11 (for example, adjusting brightness of the LED 11).

In the embodiment, the sensor 3 can be personnel sensor for example, and arranged at the same location as that of the lamp 1. When the sensor 3 senses that personnel enters the location, the first control command C1 can be sent out automatically, thus the lamp 1 can emit by the controlled LED 11.

Besides, the bluetooth module 13 also can wirelessly receive a second control command C2 transmitted from an external controller 4, and generate the PWM signal according to the second control command C2, when the bluetooth module 13 works under the mesh network mode. In the embodiment, the controller 4 can be, for example but not limited, a remote controller of the lamp 1, or a mobile device (such as smart phone) connected to the lamp 1 for controlling.

The present invention is mainly characterized in that the bluetooth module 13 also can receive a switching command C3 and a beacon data D1 transmitted by another lamp 1 within transmission range, when the bluetooth module 13 works under the mesh network mode. The bluetooth module 13 can configure itself according to the switching command C3 and the beacon data D1, and further can transmit the received switching command C3 and the beacon data D1 peer-to-peer to other lamp 1 within transmission range. The switching command C3 is mainly used for enabling/disabling the beacon mode of the bluetooth module 13, and the beacon data D1 is mainly used for updating the beacon content 1341 (described in detail later) stored in the bluetooth module 13.

If a plurality of the lamps 1 (for example, with number of 500 or 1000) are arranged at a particular spot (such as department store, market, or parking spot), the lamps 1 can establish a mesh network by the mesh network mode of the inner bluetooth module 13, for transmitting command and data. If the lamps 1 or the bluetooth modules 13 need configuration or adjustment, administrator can directly transmit the corresponding switching command C3 and the beacon data D1 remotely to the closest bluetooth module 13 (i.e. the closest lamp 1). The bluetooth module 13 transmits (according to the aforementioned mesh network) the switching command C3 and the beacon data D1 peer-to-peer to other bluetooth module 13 at the particular spot under the mesh network mode. In this way, it is very convenient that the administrator does not need to go to the site personally and does not need to configure the bluetooth modules 13 one by one.

Figure 2:
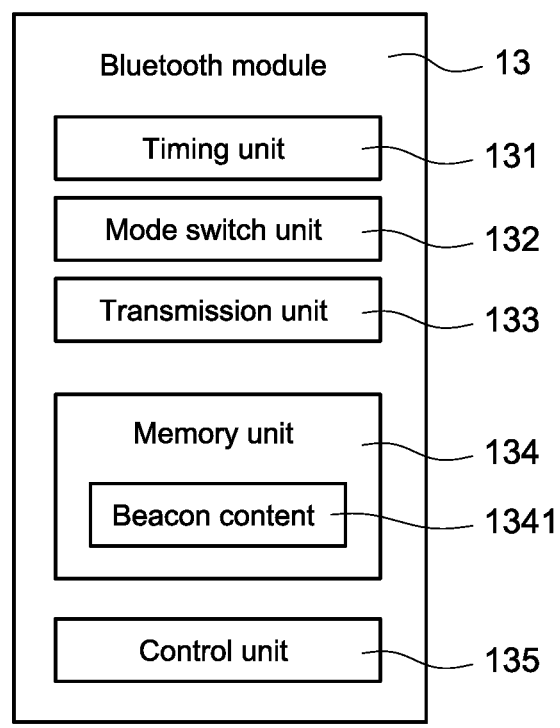
FIG. 2 shows a block diagram of a bluetooth module according to a first embodiment of the present invention.

Please refer to FIG. 2 together, FIG. 2 shows a block diagram of a bluetooth module according to a first embodiment of the present invention. As shown in FIG. 2, the bluetooth module 13 mainly has a timing unit 131 and a mode switch unit 132. Specifically, the timing unit 131 keeps counting a first time (for example, 900 ms) and a second time (for example, 100 ms) during a period. If a time period of the first time counted by the timing unit 131 elapses, the mode switch unit 132 switches the bluetooth module 13 from the mesh network mode to the beacon mode. Additionally, if a time period of the second time counted by the timing unit 131 further elapses, the mode switch unit 132 switches the bluetooth module 13 from the beacon mode to the mesh network mode.

Specifically, before the bluetooth module 13 is powered off, the timing unit 131 continuously counts the first time and the second time, and the mode switch unit 132 continuously controls (according to trigger of the timing unit 131) the bluetooth module 13 to switch between the mesh network mode and the beacon mode.

In the embodiment, a sum of the first time and the second time is smaller than or equal to 1 sec. However, the first time and the second time can be adjusted according to practical requirement, but not limited. The present invention controls the bluetooth module 13 to rapidly switch between two modes in an extremely short time, to simulate that a single bluetooth module can operate under both of two scenarios adopting different transmission protocols simultaneously. The beacon mode pushes message to user near the bluetooth module 13 and provides micro-location to user, while the mesh network mode transmits command and data for adjusting status of the beacon mode and the beacon content 1341 peer to peer.

The bluetooth module 13 also includes a transmission unit 133 and a memory unit 134. Under the mesh network mode, the bluetooth module 13 receives the switching command C3 and the beacon data D1 from the transmission unit 133, and transmits the switching command C3 and the beacon data D1. Under the beacon mode, the bluetooth module 13 broadcasts the beacon content 1341 externally by the transmission unit 133.

The beacon content 1341 can be stored in the memory unit 134 in advance. In the embodiment, the beacon content 1341 includes information that the administrator wants to transmit to the user near the lamp 1. For example, if the lamp 1 is arranged in a department store, then the beacon content 1341 can be location of the lamp 1 (for example, section A in 3F), or particular message relative to time (for example, there is a sale in some store in 5F on 16:00). In this way, when the bluetooth module 13 works under the beacon mode, if the user is within transmission range of the bluetooth module 13, the beacon content 1341 pushed by the bluetooth module 13 can be received by the mobile device.

As mentioned above, the beacon content 1341 can include particular message relative to time, thus if the particular message needs to be changed, the administrator can transmit the beacon data D1 directly from a remote end. If the bluetooth module 13 works under the mesh network mode, a server 6 (as the server 6 shown in FIG. 5B) or another bluetooth module 13 can receive the beacon data D1, and can adjust the beacon content 1341 stored therein based on the beacon data D1.

It should be noted that, part of the lamp 1 can be arranged at a desolate or less-inhabited place (for example, parking space, or a closed store). In the present invention, administrator can transmit the switching command C3 from a remote end. The switching command C3 commands particular bluetooth module 13 to enable/disable the beacon mode. If the bluetooth module 13 receives the switching command C3 and disables the beacon mode according to command of the switching command C3, then the bluetooth module 13 will works under the mesh network mode all the time, and stop broadcasting externally. If the bluetooth module 13 receives the switching command C3 again and enables the beacon mode according to command of the switching command C3, then the bluetooth module 13 can switch between the mesh network mode, and beacon mode to work.

The bluetooth module 13 further includes a control unit 135. if the bluetooth module 13 receives the corresponding first control command C1 or second control command C2 externally from the sensor 3 or the controller 4 by the transmission unit 133, the control unit 135 generates (according to the content of the control commands) the corresponding PWM signal and outputs the corresponding PWM signal to the driver 12. In this way, the driver 12 can control the LED 11 correspondingly according to the PWM signal.

It should be noted that, each of the units 131-135 mentioned above can be implemented with each hardware unit in the bluetooth module 13, or can be implemented with the software executed in the bluetooth module 13, and divided into independent units based on each corresponding function of the software, not limited.

Figure 3:
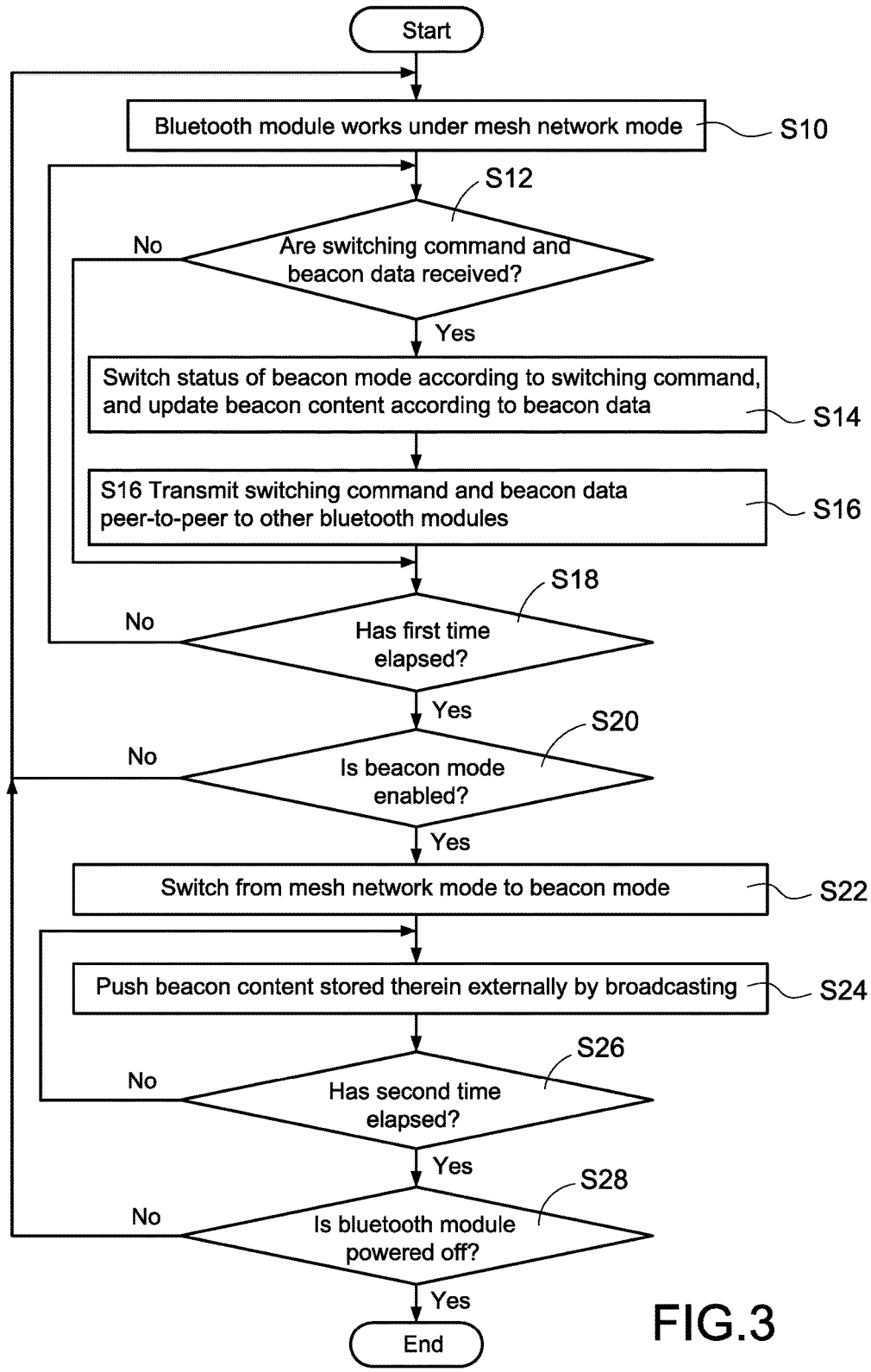
FIG. 3 shows a flowchart of switching according to a first embodiment of the present invention.

Then please refer to FIG. 3, FIG. 3 shows a flowchart of switching according to a first embodiment of the present invention. FIG. 3 discloses a mode switching method of a multi-modes bluetooth module of the present invention (hereafter the method), and the method can be applied to the bluetooth module 13 shown in FIG. 1, and to the lamp 1 including the bluetooth module 13.

As shown in FIG. 3, first, the bluetooth module 13 works under the mesh network mode in power-on status (step S10), and under the mesh network mode determines if the switching command C3 and the beacon data D1 are received (step S12). It should be noted that, the bluetooth module 13 can receive the switching command C3 and the beacon data D1 transmitted peer to peer from other bluetooth modules 13 (i.e. other lamps 1) within the transmission range, and can receive the switching command C3 and the beacon data D1 directly sent from the server 6 within the transmission range, not limited.

If the switching command C3 and the beacon data D1 are actually received, then the bluetooth module 13 switches (according to the switching command C3) enabled/disabled status of the beacon mode, and updates (according to the beacon data D1) the beacon content 1341 (step S14). Besides, the bluetooth module 13 further transmits the switching command C3 and the beacon data D1 peer-to-peer to other bluetooth modules 13 within the transmission range (step S16). In the present invention, there is no strict executing sequence for step S14 and step S16, the bluetooth module 13 can execute step S14 and then execute step S16, vice versa.

It should be noted that if the administrator generates and transmits the switching command C3 and the beacon data D1, an adjustment object of the switching command C3 and/or the beacon data D1 can be preset (for example, configuring media access control (MAC) address to lock on one or more particular bluetooth modules 13). If the bluetooth module 13 receives the switching command C3 and confirms that the adjustment object of the switching command C3 is the bluetooth module 13, then the bluetooth module 13 enables/disables (according to the content of the switching command C3) the beacon mode. If the bluetooth module 13 receives the beacon data D1 and confirms that the adjustment object of the beacon data D1 is the bluetooth module 13, then the bluetooth module 13 updates the beacon content 1341 according to the beacon data D1. In view of this, step S14 mentioned above does not need to be executed.

If step S14 and step S16 are finished, or the bluetooth module 13 does not receive the switching command C3 or the beacon data D1, the bluetooth module 13 switches from the mesh network mode to the beacon mode. Specifically, the bluetooth module 13 determines if the first time has elapsed (step S18), and keeps working under the mesh network mode before the first time elapses, and repeats executing step S12 to step S16. If the bluetooth module 13 determines the first time has elapsed, the bluetooth module 13 switches from the mesh network mode to the beacon mode.

More specifically, if the bluetooth module 13 determines that the first time has elapsed, it can further determine if the beacon mode is enabled (step S20), that is, if the beacon function of the bluetooth module 13 is disabled according to the switching command C3. If the beacon mode has been disabled, then the method of the present invention return to step S10, the bluetooth module 13 does not switch the mode, to keep working under the mesh network mode. If the beacon mode has been enabled, then the bluetooth module 13 switches from the mesh network mode to the beacon mode (step S22).

After step S22, the bluetooth module 13 pushes the beacon content 1341 stored therein externally by broadcasting under the beacon mode (step S24). In the embodiment, the beacon content 1341 can be data originally stored therein, or the data updated by the beacon data D1, not limited. After step S24, the bluetooth module 13 can switch from the beacon mode to the mesh network mode.

Specifically, in step S24, the bluetooth module 13 determines if the second time has elapsed (step S26), and keeps working under the beacon mode before the second time elapses, and repeats executing step S24. If the bluetooth module 13 determines that the second time has elapsed, the bluetooth module 13 switches from the beacon mode to the mesh network mode (step S10).

More specifically, if the bluetooth module 13 determines that the second time has not elapsed, the bluetooth module 13 further determines if the bluetooth module 13 is powered off (step S28), and switches to work under the mesh network mode before being powered off (step S10).

Figure 4:
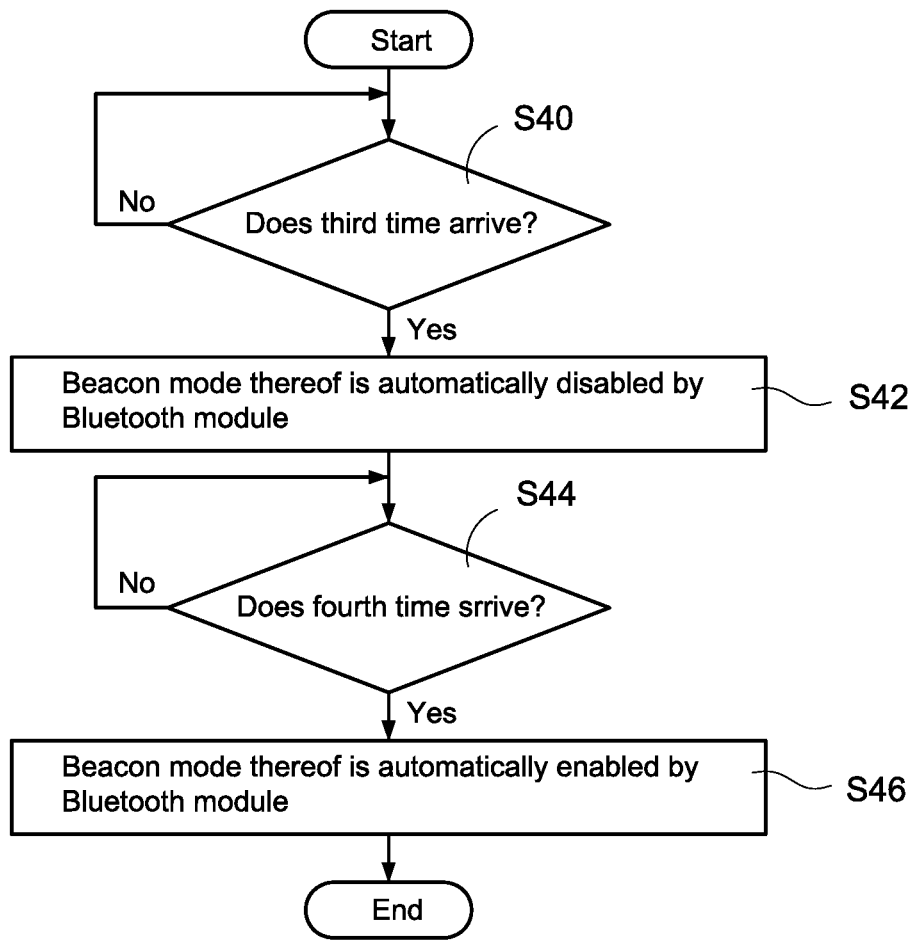
FIG. 4 shows a flowchart of beacon function according to a first embodiment of the present invention.

Then please refer to FIG. 4, FIG. 4 shows a flowchart of beacon function according to a first embodiment of the present invention. The bluetooth module 13 periodically determines if the first time (such as 900 ms) and the second time (such as 100 ms) have elapsed, and also can further determine if a third time arrives (namely, determine if the current time is a third time) (step S40), and if the third time arrives, the beacon mode thereof is automatically disabled (step S42). Furthermore, the bluetooth module 13 also can determine if a fourth time arrives (step S44), and if the fourth time arrives, the beacon mode thereof is automatically enabled (step S48).

In the embodiment, the third time can be close time (such as PM.09:30) of a place where the bluetooth module 13 (that is, the lamp 1) is positioned. If the third time arrives, it means that the place has been closed, the bluetooth module 13 does not have to push message or provide micro-location function to customers. Meanwhile, the bluetooth module 13 can disable the beacon mode itself for power-saving. The fourth time can be, for example, open time (such as AM.08:30) of a place where the bluetooth module 13 is positioned. If the fourth time arrives, it means that the place has been opened. Meanwhile, the bluetooth module 13 has to work normally, thus the bluetooth module 13 can enable the beacon mode itself.

In the embodiment mentioned above, administrator does not have to generate and transmit the switching command C3 timely; the bluetooth module 13 can automatically switch the status of the beacon mode, resulting in more convenience.

Refer to FIG. 5A to FIG. 5E, showing first to fifth action diagrams of bluetooth module according to a first embodiment of the present invention. In the embodiments, a first bluetooth module 51, a second bluetooth module 52, a third bluetooth module 53, a fourth bluetooth module 54 and a fifth bluetooth module 55 arranged in a particular place are used for example.

Figure 5A:
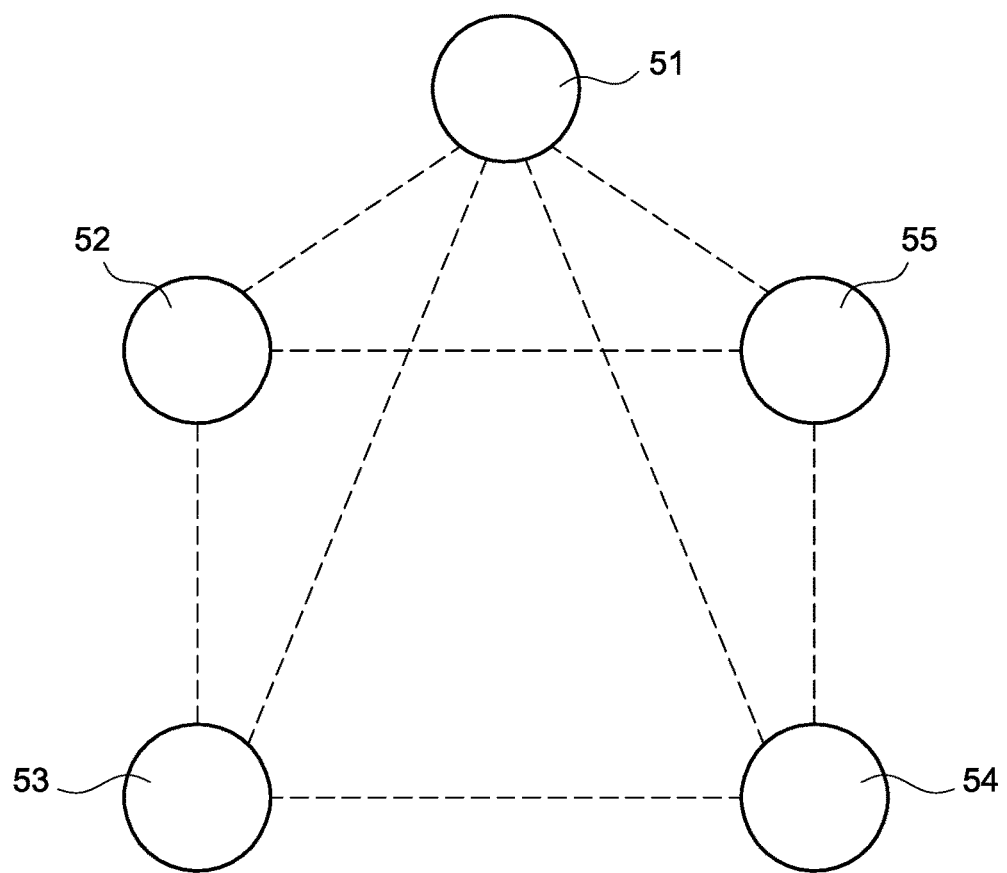
FIG. 5A shows a first action diagram of bluetooth module according to a first embodiment of the present invention.
Figure 5B:
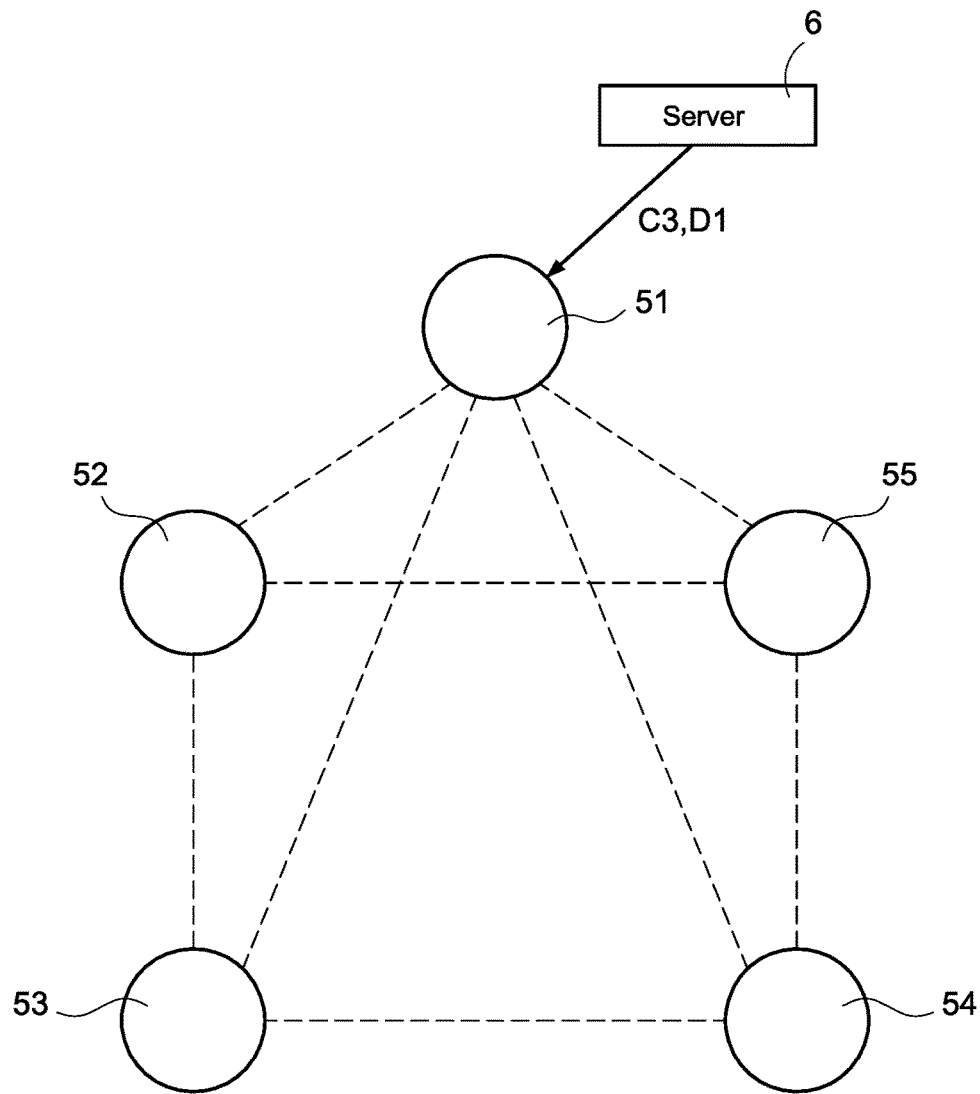
FIG. 5B shows a second action diagram of bluetooth module according to a first embodiment of the present invention.

For example, taking a period as 1 second, first, as shown in FIG. 5A, in the beginning of the period, each of the bluetooth modules 51-55 respectively works under the mesh network mode, and establishes a mesh network. Then as shown in FIG. 5B, under the mesh network mode, the first bluetooth module 51 closest to the server 6 can receive the switching command C3 and the beacon data D1 directly sent from the server 6.

Figure 5C:
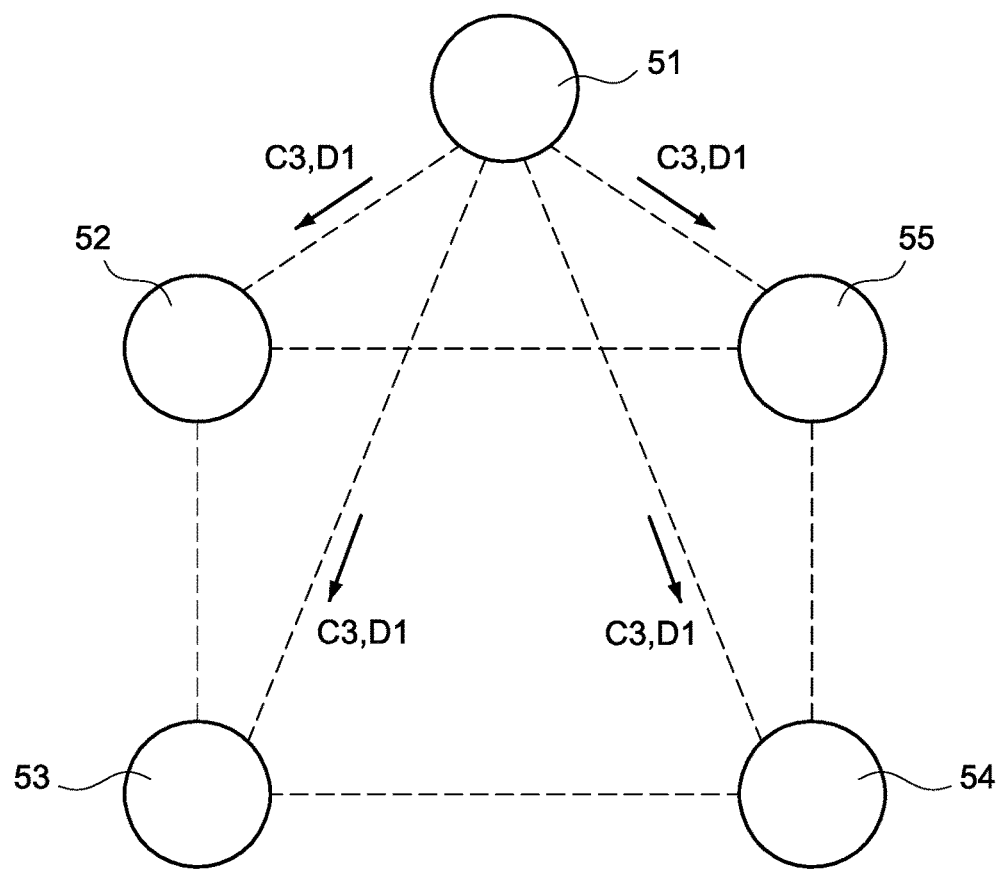
FIG. 5C shows a third action diagram of bluetooth module according to a first embodiment of the present invention.

Then as shown in FIG. 5C, before the first time elapses, the first bluetooth module 51 respectively transmits the received switching command C3 and beacon data D1 to the second bluetooth module 52, the third bluetooth module 53, the fourth bluetooth module 54 and the fifth bluetooth module 55 within the transmission range peer to peer.

Figure 5D:
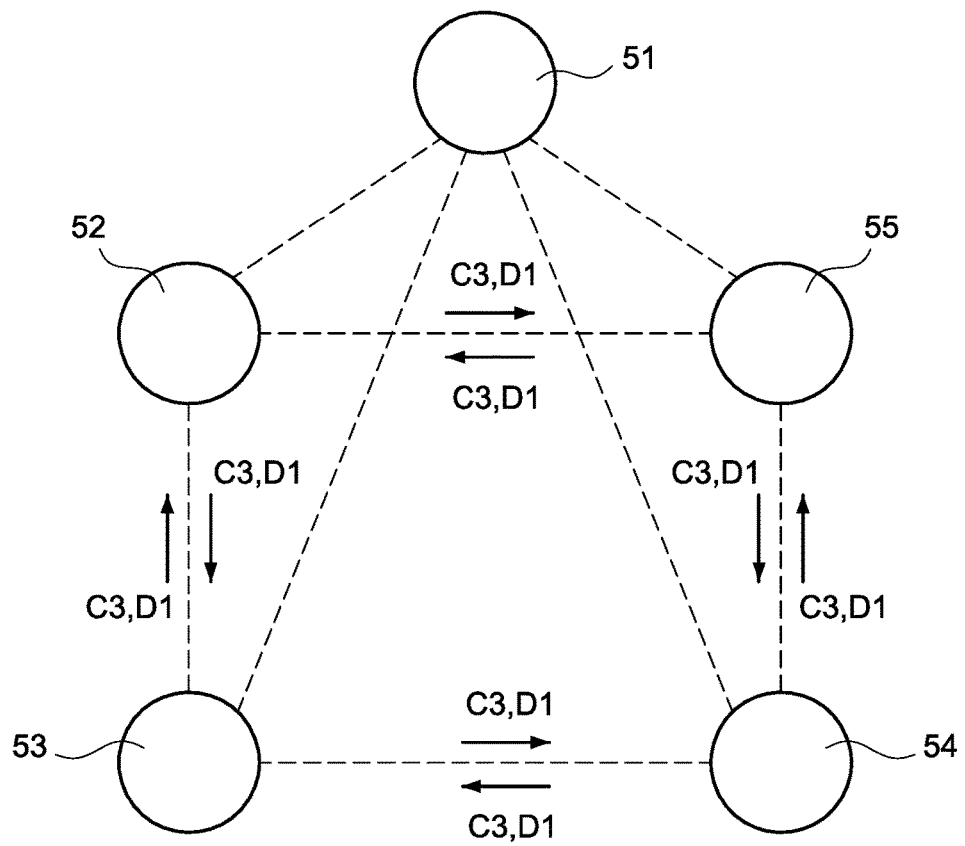
FIG. 5D shows a fourth action diagram of bluetooth module according to a first embodiment of the present invention.

Then as shown in FIG. 5D, before the first time elapses, the second bluetooth module 52, the third bluetooth module 53, the fourth bluetooth module 54 and the fifth bluetooth module 55 can respectively receive the switching command C3 and the beacon data D1 from the first bluetooth module 51. Besides, each of the bluetooth modules 52-55 respectively transmits the received switching command C3 and beacon data D1 to other bluetooth modules within the transmission range peer to peer.

It should be noted that, meanwhile, one or more bluetooth modules (belonging to adjustment object of the switching command C3 and the beacon data D1) would adjust (according to the switching command C3 and the beacon data D1) status and the beacon content 1341 of the beacon mode thereof. In the embodiment, the adjustment objects of the switching command C3 are the second bluetooth module 52, the fourth bluetooth module 54 and the fifth bluetooth module 55. The server 6 disables the beacon mode of the second bluetooth module 52, the fourth bluetooth module 54 and the fifth bluetooth module 55 by the switching command C3. The adjustment objects of the beacon content 1341 are the first bluetooth module 51 and the third bluetooth module 53. The server 6 updates the beacon content 1341 of the first bluetooth module 51 and the third bluetooth module 53 by the beacon data D1.

Figure 5E:
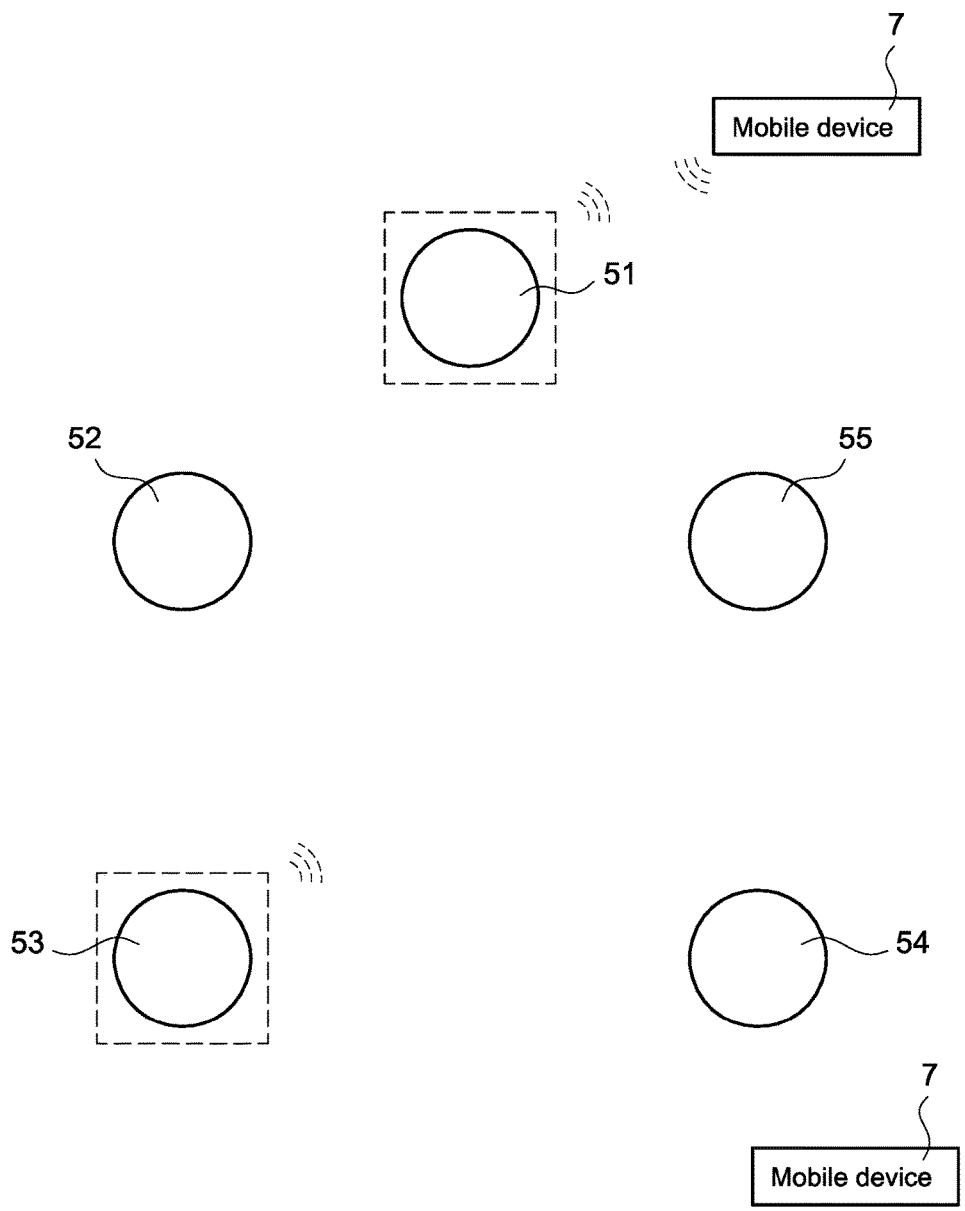
FIG. 5E shows a fifth action diagram of bluetooth module according to a first embodiment of the present invention.

Finally, as shown in FIG. 5E, after the first time elapses (such as 900 ms/1 s), the first bluetooth module 51 and the third bluetooth module 53 switches from the mesh network mode to the beacon mode. Under the beacon mode, the first bluetooth module 51 and the third bluetooth module 53 can broadcast the beacon content 1341 externally, for pushing message to a mobile device 7 outside, or providing micro-location function to the mobile device 7.

Besides, in the embodiment, the beacon mode of the second bluetooth module 52, the fourth bluetooth module 54 and the fifth bluetooth module 55 has been disabled, thus in the second time (such as 100 ms/1 s), the second bluetooth module 52, the fourth bluetooth module 54 and the fifth bluetooth module 55 still keep working under the mesh network mode. Finally, when the second time elapses, it means that a period is ended, thus the first bluetooth module 51 and the third bluetooth module 53 switch from the beacon mode to the mesh network mode, and re-calculate a new period.

In the present invention, it is very convenient to the administrator for no need to configure the beacon devices one by one, or to remove the beacon devices not being used one by one.

Thus, particular embodiments have been described. Other embodiments are within the scope of the following claims. For example, the actions recited in the claims may be performed in a different order and still achieve desirable results.

What is claimed is:

1. A lamp having multi-modes bluetooth module, the lamp comprising:
   a light emitting diode (LED);
   a driver electrically connected to the LED and controlling the LED; and
   a bluetooth module electrically connected to the driver for receiving power, the bluetooth module supporting a mesh network mode and a beacon mode, and switching between the mesh network mode and the beacon mode periodically;
   wherein the bluetooth module transmits a switching command and a beacon data to other bluetooth modules within a transmission range peer to peer when working under the mesh network mode; the bluetooth module pushes a beacon content stored in the bluetooth module externally by broadcasting when working under the beacon mode;
   wherein the switching command is used for switching the beacon mode between an enabled/disabled status, the beacon data is used for updating the beacon content.

2. The lamp having multi-modes bluetooth module of claim 1, wherein the bluetooth module comprises:
   a timing unit counting a first time and a second time; and
   a mode switch unit switching the bluetooth module from the mesh network mode to the beacon mode after the first time elapses, and switching the bluetooth module from the beacon mode switches to the mesh network mode after the second time elapses.

3. The lamp having multi-modes bluetooth module of claim 2, wherein a sum of the first time and the second time is smaller than 1 second.

4. The lamp having multi-modes bluetooth module of claim 2, wherein the bluetooth module further comprises:
   a transmission unit receiving and transmitting the switching command and the beacon data peer to peer under the mesh network mode, and broadcasting the beacon content externally under the beacon mode; and
   a memory unit storing the beacon content.

5. The lamp having multi-modes bluetooth module of claim 4, wherein the bluetooth module further comprises a control unit, the control unit generates a pulse width modulation (PWM) signal and outputs the PWM signal to the driver according to the control command, when the transmission unit receives a control command, wherein the driver controls the LED according to the PWM signal.

6. A mode switching method for multi-modes bluetooth module, the mode switching method comprising:
   a) operating the bluetooth module under a mesh network mode;
   b) transmitting a switching command and a beacon data to other bluetooth modules within a transmission range peer-to-peer under the mesh network mode;
   c) switching a beacon mode of the bluetooth module between an enabled/disabled status based on the switching command, the beacon data is used for updating the beacon content, and updating a beacon content stored in the bluetooth module based on the beacon data;
   d) switching the bluetooth module from the mesh network mode to a beacon mode;
   e) pushing the beacon content externally by broadcasting under the beacon mode;
   f) switching the bluetooth module from the beacon mode to the mesh network mode; and
   g) repeating step a to step f before the bluetooth module being powered off.

7. The mode switching method of claim 6, wherein the mode switching method comprises the following steps before step d:
   d01) counting time and determining whether a first time elapses;
   d02) repeating step b and step c before the first time elapses; and
   d03) executing step d after the first time elapses.

8. The mode switching method of claim 7, wherein the mode switching method comprises the following steps before step f:
   f01) counting time and determining whether a second time elapses;
   f02) repeating step e before the second time elapses; and
   f03) executing step f after the second time elapses.

9. The mode switching method of claim 8, wherein the mode switching method further comprises the following steps:
   h) determining whether a third time arrives;
   i) automatically disabling the beacon mode of the bluetooth module when the third time arrives;
   j) determining whether a fourth time arrives after step i; and
   k) automatically enabling the beacon mode of the bluetooth module when the fourth time arrives.

10. The mode switching method of claim 6, wherein step d comprises the following steps:
   d1) determining whether the beacon mode of the bluetooth module is enabled;
   d2) switching to the beacon mode when determining that the beacon mode is enabled; and
   d3) executing the step a when determining that the beacon mode is disabled.

* * * * *